INVENTORS
RICHARD E. HAVER
BY FREDERICK K. ULRICH
Woodhams, Blanchard & Flynn
ATTORNEYS

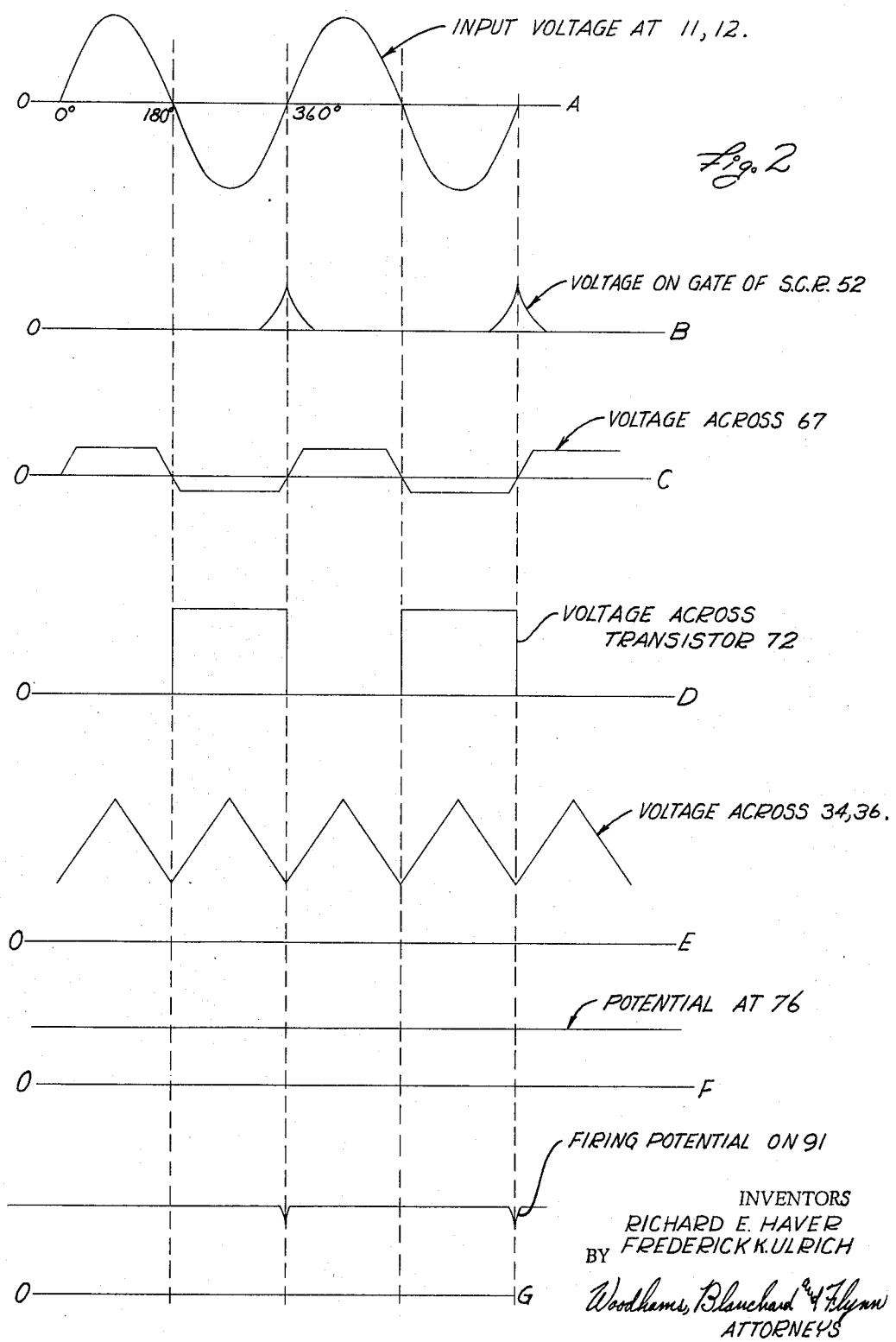

United States Patent Office 3,286,135
Patented Nov. 15, 1966

3,286,135
TIMING CIRCUIT
Richard E. Haver, Detroit, and Frederick K. Ulrich, East Detroit, Mich., assignors to Robotron Corporation, Detroit, Mich., a corporation of Michigan
Filed Jan. 30, 1964, Ser. No. 341,379
7 Claims. (Cl. 317—142)

This invention relates to electrical timing circuits and more particularly relates to a simplified but highly precise timing circuit adapted to time a single preselected interval.

The device of the invention was developed in connection with a welding control and, more specifically, was developed to control the time interval of a single function in a welding sequence comprising several such functions. Moreover, the device of the invention was designed to co-operate, if desired, with several other similar units each controlling a single separate one of the remaining welding functions. Particularly, the device of the invention is mechanically and electrically simplified whereby it is economically feasible to use a plurality of such devices in a single machine and requires a minimum number of exterior connections whereby each said device is easily replaced or interchanged in the machine. Thus, the device of the invention is particularly adaptable to use as a plug-in module or drawer unit in a machine which may include several such modules.

Previous timers, of precision approaching that of the device of the invention, have generally required a relatively large number of connections to connect the parts thereof timing a particular function to the rest of the machine. The number of such connections has, in many cases, been too high to warrant the use of such timers on a componentized or modularized basis as is the intent of the present invention. On the other hand, prevous timers of simple construction and requiring a reduced number of connections with the machine to be controlled have generally been incapable of precision comparable to the instant invention.

Hence, the objects of this invention include:

(1) To provide an electrical timing circuit capable, upon initiation, of timing a highly precise interval of time and signaling the beginning and the end of said interval.

(2) To provide a device, as aforesaid, particularly adapted to timing a single function or several functions concurrent in time.

(3) To provide a device, as aforesaid, which is particularly adapted to work in conjunction with several other similar devices for timing several separate functions of a complex, electrically controlled, machine which functions need not be concurrent in time.

(4) To provide a device, as aforesaid, requiring a minimum number of interconnections with the machine being controlled or with other similar units used in conjunction therewith on said machine.

(5) To provide a device, as aforesaid, which is of simplified and economical construction, which is capable of manufacture with readily available standard parts and which is particularly adaptable to use as a plug-in or drawer unit in combination with several other similar units in a complex, electrically controlled, machine.

Other objects and purposes of the invention will be apparent to persons acquainted with circuits of this general type upon reading the following disclosure and inspecting the accompanying drawings.

In the drawings:

FIGURE 2 is a series of voltage-versus-time diagrams taken at various points in the circuit of FIGURE 1.

Figure 1:
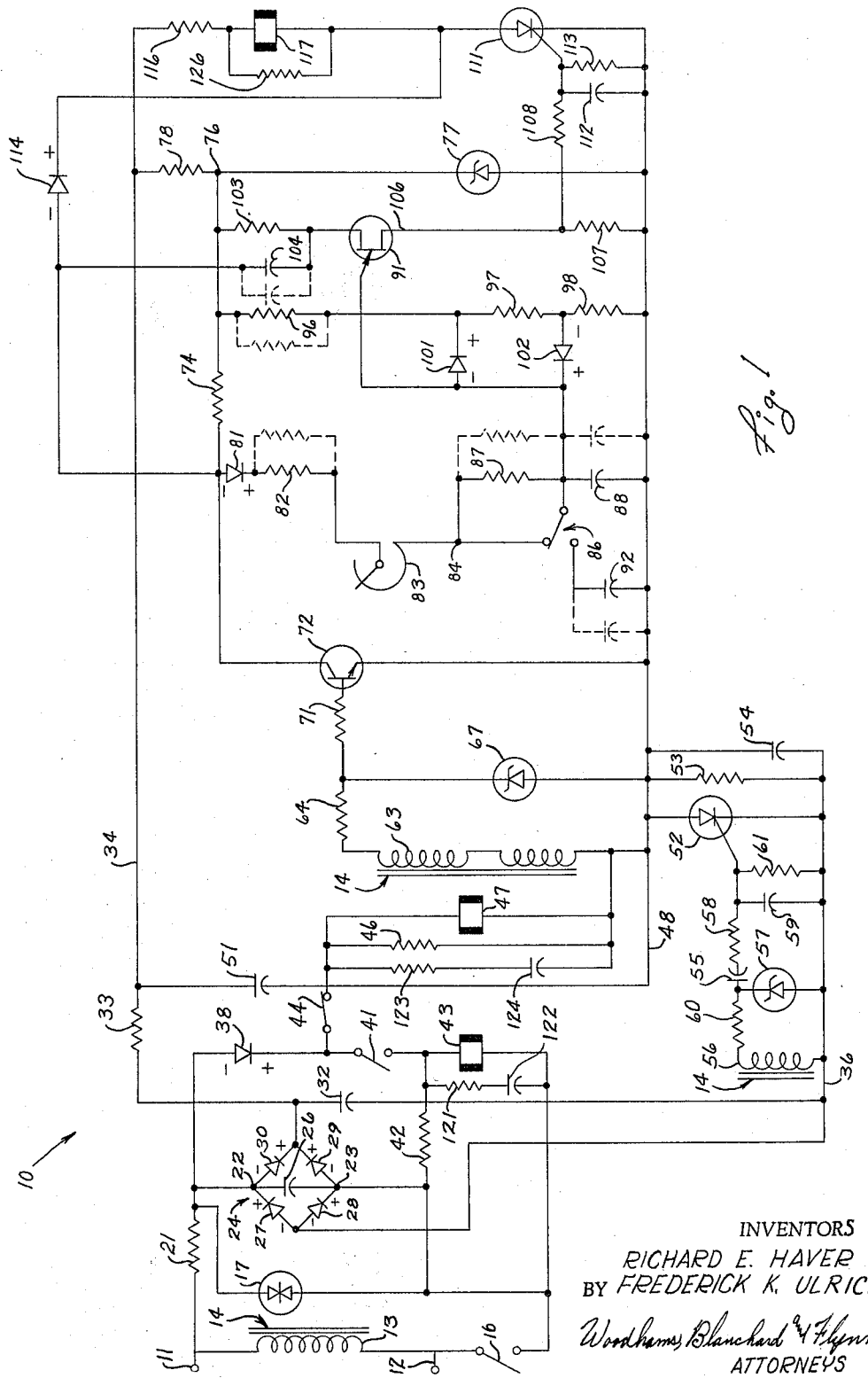
FIGURE 1 is a schematic diagram of a preferred circuit embodying the invention.

In the folowing disclosure, words such as "upper," "lower," "left," and "right," derivatives thereof, and words of similar import will refer to the drawings only and have no limiting significance.

GENERAL DESCRIPTION

In general, the objects and purposes of this invention are met by providing a welding timer energizable by a source of alternating voltage upon closure of an initiation switch. After such closure and at a predetermined point in the wave form of the source voltage, first relay means are energized to signal the start of the timed interval. The source voltage controls the conduction of a valve whose periodic output is applied through suitable means to one of the bases of the unijunction transistor. Said output is also applied through suitable timing means to the emitter of said unijunction transistor. Upon timing out of said timing means, emitter potential of the unijunction reaches its maximum level. Shortly thereafter, and in predetermined phase relation with the source voltage, the output of said valve changes the potential on said one base whereupon said unijunction conducts at a precisely predetermined point in time. Such conduction turns off said first relay means and turns on second relay means thus signaling the end of a timed interval to means outside the circuit.

DETAILED DESCRIPTION

The timer 10 has input terminals 11 and 12 fed by an alternating voltage source. An initiating switch 16 and a transient voltage suppressor device 17 in series therewith are in parallel with the primary winding 13 of a transformer 14 across the input terminals 11 and 12. The initiating switch 16 may be manually actuated or may be the output relay contact of a previous similar timer. Closure of the initiating switch 16 starts the timer 10 and in the particular embodiment shown, the initiating switch 16 must be held closed until the completion of the timed period.

A resistance 21 and the input terminals 22 and 23 of a full-wave rectifier bridge 24 in series therewith are connected across the transient suppressor 17. A small capacitor 26 may be placed across the input terminals 22 and 23 to short out any possible remaining transient or high-frequency signals. The bridge 24 comprises rectifiers 27, 28, 29 and 30 and delivers a rippling D.C. output across an output capacitor 32. The positive output terminal of the bridge 24 connects through a resistance 33 to a positive potential line 34 and the remaining of reference output terminal of the bridge 24 connects to a reference line 36. The input terminals 22 and 23 of the bridge 24 are in parallel with a series circuit comprising a positively oriented diode 38 which acts as a half-wave rectifier, the normally open relay contacts 41 and a parallel resistance 42 and relay coil 43 which connect to the input terminal 23 of the bridge 24. The diode 38 also connects through the normally closed relay contacts 44 and a parallel resistance 46 and relay coil 47 to a common bus line 48. A small filter capacitor 51 connects the positive potential line 34 to the bus line 48.

A silicon controlled rectifier, or S.C.R. 52 has its anode connected to the bus 48 and its cathode connected to the reference line 36. The S.C.R. 52 is shunted by a parallel resistance 53 and capacitance 54. A secondary winding 56 of the transformer 14 is connected at the lower end thereof to the reference line 36. The upper end of the winding 56 connects through a series resistance 60, capacitor 55 and resistance 58 to the gate of the S.C.R. 52. A Zener diode 57 connects across the secondary winding 56 and resistance 60. A parallel capacitance 59 and resistance 61 connect the gate and cathode of the S.C.R. 52.

The voltage appearing on the upper end of the secondary winding 56 is phased with that appearing on the input terminal 11.

A secondary winding 63 of the transformer 14 connects from the bus 48 to a relatively large resistance 64 which connects in turn through a resistance 71 to the base of a transistor 72. The secondary 63 and resistance 64 are shunted by a Zener diode 67 having its anode connected to the bus 48. The emitter of the transistor 72 connects to the bus 48 and the collector thereof connects through a collector resistor 74 to a junction point 76. The junction point 76 is connected through a Zener diode 77 to the bus line 48 and through a resistance 78 to the positive potential line 34. The Zener diode 77 maintains a constant potential between the junction point 76 and the bus 48 and hence across the transistor 72 and resistor 74 despite ripple or other fluctuations in the voltage across the lines 34 and 48.

The collector of the transistor 72 also connects through a series circuit comprising a positive pulse passing diode 81, resistance 82 and potentiometer 83 to a junction point 84. The junction point 84 connects through a resistor 87, which may be shorted out by appropriate setting of a switch 86, to the emitter of a unijunction transistor 91. A capacitor 88 connects said emitter to the bus 48. The switch 86 may be reset to place a capacitor 92 across the capacitor 88 and simultaneously to unshort the resistance 87. A voltage divider comprising the resistances 96, 97 and 98 connects from the junction point 76 to the bus 48. The emitter of the unijunction transistor 91 is connected through the anode of a diode 101 between the resistances 96 and 97 and is also connected through the cathode of a diode 102 between the resistances 97 and 98. The upper base of the unijunction transistor 91 is connected through a resistance 103 to the junction point 76 and is also connected through a capacitance 104 to the collector of the transistor 72. The hereinabove-described resistances 82, 87 and 96 may, if desired, be paralled with suitable adjustable calibration resistances as indicated in dotted lines in FIGURE 1 for adjusting the operating parameters of the circuit. Similarly, the capacitances 88, 92 and 104 may be shunted by suitable calibration capacitances as indicated in dotted lines in FIGURE 1.

The second or lower base 106 of the unijunction 91 connects through a bias resistor 107 to the bus 48 and further connects through a dropping resistor 108 to the gate of an S.C.R. 111. The gate and cathode of said S.C.R. 111 are shunted by a parallel capacitance 112 and resistance 113. The collector of the transistor 72 connects through a positively oriented diode 114 to the anode of the S.C.R. 111. The positive potential line 34 connects through a series resistance 116 and relay coil 117 to the anode of the S.C.R. 111, the cathode of which connects to the bus line 48. The relay coil 117 controls the opening and closing of the switches 41 and 44. Hence, when the S.C.R. 111 conducts through the coil 117 the contacts 44 are opened and the contacts 41 are closed whereby current ceases to flow through the relay coils 47 and begins to flow to the relay coil 43 which action signals the end of the timed interval.

A series resistance 121 and capacitance 122, a series resistance 123 and capacitance 124 and a resistance 126 may be connected across the relay coils 43, 47 and 117, respectively, if desired, for transient protection.

OPERATION

Assuming a source of alternating voltage, e.g., 115 volts A.C., to be impressed on the input terminals 11 and 12, the voltage wave form shown in FIGURE 2a appears across the primary winding 13 of the transformer 14 and said primary winding in turn impresses an alternating voltage upon its secondaries 56 and 63. The remainder of the circuit illustrated in FIGURE 1 will not, however, be affected by the voltage across the transformer 14 while the initiation switch 16 remains open. The upper end of the secondary 56 is in phase with the input terminal 11 and, thus, the negative peak occurring at the terminal 11 when the input voltage is at its 270 degree point indicated in FIGURE 2a will occur at the upper end of the transformer secondary winding 56 whereby the left-hand side of the capacitor 55 will be charged negatively with respect to the right-hand side thereof. As the transformer voltage continues to the 360 degree point the capacitor 55 will not have had time to discharge completely whereby, as said 360 degree point is reached, the gate of the S.C.R. 52 is made momentarily positive with respect to the cathode thereof and as shown in FIGURE 2b. This comprises the starting signal for the S.C.R. 52 and will start conduction of said S.C.R. 52 if the initiating switch 16 has been previously closed. Thus, it will be seen that regardless of the time in the waveform of the input voltage to which the initiation switch 16 is closed, the S.C.R. 52 will not fire until the input waveform has achieved, and achieved very exactly, a particular phase point which in this particular embodiment is a zero degree point or, in other words, a 360 degree point.

Transients caused by the closure of the switch 16 will be shorted out by the transient suppression device 17 whereby the sine wave shown in FIGURE 2a will be impressed on the input terminals 22 and 23 of the full-wave rectifier bridge 24. Said bridge 24 produces across the positive potential line 34 and reference line 36 a pulsating or rippling D.C. voltage shown in FIGURE 2e. It will be recalled that the input terminals of the rectifier bridge are paralleled by the series circuit comprising the diode 38, switch 44, parallel resistance 46 and coil 47, S.C.R. 52, reference line 36 and rectifier 28. Upon closure of the switch 16, the diode 38, as a half-wave rectifier, passes the positive half-waves of the source voltage therethrough and impresses same through the normally closed switch 44 and relay coil 47 upon the anode of the S.C.R. 52. Thus the occurrence of a zero phase point in the sine waveform (FIGURE 2a) of the voltage on the anode of the S.C.R. 52 will coincide with the occurrence of the above-described positive pulse (FIGURE 2b) on the gate thereof whereby the S.C.R. 52 conducts through the relay coil 47 for the duration of the positive potential on its anode which in this case will be one half cycle or 180 degrees in the input waveform. Such energization of the relay 47 activates any convenient switching means to signal the start of the timed interval which in this particular embodiment occurs at the first zero degree phase point in the input waveform appearing after the closure of the initiating switch 16. For example, said relay 47 may be used to maintain the initiation switch 16 in closed position and/or start a weld current.

Furthermore, conduction of the S.C.R. 52 places the bus 48 at the potential of the reference line 36 and discharges the capacitor 54 so that the upper side thereof assumes reference potential.

As was mentioned hereinbefore, the transformer 14 is continuously energized regardless of the open or closed state of the initiation switch 16 and therefore the secondary 63 thereof is continually energized with the upper end thereof being in phase with the input terminal 11. The Zener diode 67 limits the positive or negative voltage on the base of the transistor 72 with respect to the bus 48 as shown in FIGURE 2c. Although the transistor 72 is biased at its base to conduct during the initial 180 degree of each cycle of the sine wave voltage appearing at the terminal 11, the transistor 72 cannot conduct until the bus 48 is placed at reference potential by the conduction of the S.C.R. 52 and until a suitable voltage is applied to its collector.

Closure of the initiating switch 16 applies a positive D.C. voltage through the positive potential line 34 and resistance 78 to the junction point 76. With the conduction of the S.C.R. 52 connecting the bus 48 to the reference line 36, the Zener diode 77 maintains a predetermined constant D.C. voltage drop from the junction point 76 to the bus 48 which in a particular embodiment was 18 volts. Said constant D.C. potential is applied through resistor 74 and bus 48 to the collector and emitter, respectively, of the transistor 72 whereby said transistor begins conduction.

The transistor 72 is thereafter controlled by the base potential thereon whereby said transistor 72 conducts for the first one-half of each succeeding cycle as long as there is a voltage drop across the Zener diode 77. The S.C.R. 52 conducts continuously through the full-wave rectifier bridge 24 drawing current through the voltage divider comprised of resistors 96, 97, 98 the bases of unijunction 91 and the Zener diode 77. Thus, the bus 48 is continuously connected to the reference side of the bridge 24 and there is a continuous voltage drop across the Zener 77 as long as the S.C.R. 52 is on.

Cessation of conduction of the transistor 72 at the 180 degree point of the supply wave raises the potential on the collector thereof as shown in FIGURE 2d. This high potential is applied through the rectifier 81, the resistance 82 and potentiometer 83 to the junction point 84. When the switch 86 is in the position shown in FIGURE 1 for shorting the resistor 87, the high potential appearing at the point 84 charges the capacitor 88. The resistors 82 and 83 limit the amount of charge deposited on the capacitor 88 during the half cycle in which the transistor 72 is off. The diode 81 prevents discharge of the capacitor 88 during conduction of the valve 72.

The resistances 96, 97 and 98 comprising the voltage divider across the Zener diode 77 are such that a relatively low positive voltage appears at the anode of the diode 102 and a relatively high voltage appears at the cathode of the diode 101. Said low positive voltage is admissible through the diode 102 to maintain a fixed minimum voltage across the capacitor 88 which in a particular embodiment was approximately one volt. This fixed minimum voltage is provided so that the charge on the capacitor 88 will be the same at the start of each new timing period and is not sufficient to fire the unijunction transistor 91. The voltage on the cathode of the diode 101 is, in a particular embodiment, nine volts and is the maximum voltage that can be applied to the emitter of the unijunction 91 because a higher voltage applied to said emitter would also appear on the anode of the diode 101 and would hence cause current flow through said diode to drop the voltage on said emitter back to said maximum level.

The switch 86 in its other position no longer shorts the resistance 87 but rather parallels the capacitors 88 and 92 and places the resistance 87 in series therewith. In this mode it will be apparent that considerably more time is required to charge said capacitors to a predetermined voltage. In either mode of the switch 86, several bursts of high potential from the collector of the transistor 72 will be required to achieve the aforesaid maximum voltage across the timing capacitor and through the emitter of the unijunction 91. For the sake of convenience in reference only, the following discussion assumes the switch 86 to be positioned as shown in FIGURE 1.

The collector of the transistor 72 is also connected through the capacitor 104 to the upper base of the unijunction transistor 91, said upper base also being connected through the resistance 103 to the junction point 76. The capacitor 104 and resistance 103 act as a differentiating circuit upon the drop in the collector potential (FIGURE 2d) in the transistor 72 at the start of conduction thereof to apply a sharp negative potential spike (FIGURE 2g) to the upper base of the unijunction 91. Thus, said spike occurs at the 360 degree point in the voltage at the input terminal 11 or at the end of a cycle of charging of the timing capacitor 88. Hence, after a sufficient number of charging cycles have taken place, the voltage appearing on the emitter of the unijunction transistor 91 will have built up sufficiently as to reach its maximum value. At the end of the charging cycle during which this maximum voltage is reached, the negative spike appearing on the upper base of the unijuiction 91 drops the voltage of said base with respect to its emitter sufficiently that the unijunction 91 may conduct. Conduction of the unijunction 91 discharges the timing capacitor 88 through the emitter and lower base 106 of the unijunction 91 and through the resistance 107 to the bus 48.

The voltage drop thus formed across the resistor 107 is applied through the resistance 108 across the capacitor 112 to cause conduction of the S.C.R. 111. Conduction of the S.C.R. 111 discharges the capacitor 104 through the diode 114 and drops the collector potential on the transistor 72 to forestall recharging of the capacitor 88 while the S.C.R. 111 conducts. The S.C.R. 111 conducts from the positive potential line 34 through the resistance 116 and relay coil 117 to the bus 48. The relay coil 117 is thereby energized to open the contacts 44 and close the contacts 41. When contacts 41 close, current flows through the diode 38, contacts 41 and relay coil 43 to signal the end of the timed interval to means outside the system, such as to terminate flow of weld current. If desired, such energization of the relay coil 43 may, by any convenient means (not shown), be used to open the initiation switch 16. Upon release of the initiation switch 16, the S.C.R. 111 stops conducting and the relay 117 is de-energized to return the contacts 41 and 44 to their former positions shown in FIGURE 1. Similarly, the S.C.R. 52 stops conduction. In this manner, the timer returns to its initial condition and completes its cycle. Opening of the initiating switch 16 at any time previous to the opening of the contacts 44 will stop the timer.

Although a particular preferred embodiment of the invention has been disclosed above for illustrative purposes, modification or variations of such disclosure, lying within the scope of the appended claims, are fully contemplated.

What is claimed is:

1. In a welding timer for timing a precise number of cycles of an alternating voltage source, the combination comprising:
   a first valve;
   direct current source means for supplying a positive D.C. potential to the anode member of said first valve;
   means supplying voltage in phase with said source voltage to the control member of said first valve; and
   connection means connecting the cathode member of said first valve to the other side of said direct current source at a preselected point in the waveform of said alternating voltage, whereby said first valve begins conduction at a preselected point in the waveform of said alternating voltage and wherein said first valve conducts intermittently at the frequency of the voltage source for producing an intermittent positive potential on the anode member thereof.

2. The device defined in claim 1 including:
   a timing element;
   means applying said intermittent positive potential to said timing element whereby the potential across said timing element will reach a preselected level in several cycles of said source voltage;
   a second valve and means placing said potential developed across said timing element upon a control element of said second valve;
   differentiating means forming a sharp negative pulse upon the drop in potential on said anode element of said first valve accompanying the conduction of said first valve whereby the appearance of said preselected level of potential upon said control element of said second valve simultaneously with, or followed by, the appearance of one of said sharp pulses on a further control element of said second valve causes said second valve to conduct at a predetermined phase point on the waveform of said alternating source voltage.

3. The device defined in claim 2 including:
a third valve biased to conduct upon conduction of said second valve;
means maintaining a low potential on said anode member of said first valve upon conduction of said third valve whereby to prevent a potential drop across said timing element and to prevent application of said pulses to said further control member of said second valve by said differentiating means;
means energized by conduction of said third valve for signaling the end of a preselected number of cycles of said alternating voltage source.

4. The device defined in claim 1 wherein said connection means comprises a fourth valve controlled from said alternating voltage source.

5. The device defined in claim 4 including first relay coil means and means connecting same in series with said fourth valve whereby said fourth valve conducts half cycles of said alternating voltage source through said first relay coil means.

6. The device defined in claim 1, including:
a second valve and means causing conduction thereof at the end of a preselected interval after the start of conduction of said first valve;
a first relay energizable by conduction through said second valve and first and second switch contacts controlled by said first relay;
second and third relay means, said second relay means, said connection means and said first switch contacts being connected in a series circuit and initiation means for connecting said series circuit across said alternating current source;
said third relay means and said second switch contacts being connectible across said alternating current source by said initiating means;
whereby conduction of said second valve opens said first switch contacts to de-energize said second relay means and said connection means and closes said second switch means to energize said third relay means.

7. The device defined in claim 2 wherein said second valve is a unijunction transistor, said control element is the emitter thereof, said unijunction transistor has its bases connected across said direct current source and said further control element is one of said bases.

References Cited by the Examiner
UNITED STATES PATENTS
2,538,881 1/1951 Schommer _____ 317—142
3,107,320 10/1963 Brittain et al.

MILTON O. HIRSHFIELD, *Primary Examiner.*

L. T. HIX, *Assistant Examiner.*